(12) United States Patent
Funada

(10) Patent No.: US 6,267,490 B1
(45) Date of Patent: Jul. 31, 2001

(54) VEHICULAR LAMP

(75) Inventor: Yasuaki Funada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/513,099

(22) Filed: Feb. 25, 2000

(30) Foreign Application Priority Data

Mar. 2, 1999 (JP) .................................................. 11-053623

(51) Int. Cl.$^7$ .................................................. F21V 5/00
(52) U.S. Cl. .......................................... 362/521; 362/520
(58) Field of Search .................................. 362/231, 505, 362/507, 522, 311, 244, 293, 332, 541, 543, 544, 329; 340/475, 479

(56) References Cited

U.S. PATENT DOCUMENTS

| | | | |
|---|---|---|---|
| 4,680,680 | * 7/1987 | Iwaki | 362/521 |
| 5,642,228 | 6/1997 | Takezawa et al. | |
| 5,692,824 | 12/1997 | Ooishi | 362/505 |
| 5,756,013 | 5/1998 | Yanagihara et al. | |
| 6,024,474 | * 2/2000 | Tanaka | 362/544 |

FOREIGN PATENT DOCUMENTS

| | | |
|---|---|---|
| 2178154A | 2/1987 | (GB). |
| 2345126A | 6/2000 | (GB). |

* cited by examiner

*Primary Examiner*—Sandra O'Shea
*Assistant Examiner*—Hargobind S. Sawhney
(74) *Attorney, Agent, or Firm*—Koda & Androlia

(57) ABSTRACT

A vehicular lamp comprising a red color lens provided in front of a red color light emitting portion, clear lenses provided in front of an amber color light emitting portion and a clear light emitting portion, and a smoky color dummy lens provided in front of a dummy portion that surrounds these light emitting portions. An amber color bulb is used in the amber color light emitting portion and amber color paint is applied to the reflective surface of the reflector portion of the amber color light emitting portion. Thus, amber light is emitted when the amber color light emitting portion is lighted even though the amber color light emitting portion is covered by clear lenses; and the entire lamp chamber of the amber color light emitting portion looks uniformly luminous in an amber color despite the clear lens provided in front of the amber color light emitting portion.

5 Claims, 3 Drawing Sheets

VEHICULAR LAMP

BACKGROUND OF THE INVENTION

1. Field of the Invention

The present invention relates to a vehicular lamp that has a red color light emitting portion, an amber color light emitting portion and a clear light emitting portion which are surrounded by a dummy portion.

2. Prior Art

A typical vehicular marker lamp such as a rear combination lamp comprises a red color light emitting portion, an amber color light emitting portion and a clear light emitting portion. The front portion of each one of these light emitting portions is formed with a lens that has the same color as the luminescent color of each one of the light emitting portions. In other words, the front portion of the red color light emitting portion is red, the front portion of the amber color light emitting portion is amber, and the front portion of the clear light emitting portion is clear or has no color. In some marker lamps, due to designing demands, the surrounding areas of these three light emitting portions are formed as a dummy portion, and this dummy portion has a design color (e.g., a smoky or body color) which is different from any one of the luminescent colors of the three light emitting portions.

By forming the front portion of the dummy portion with a dummy lens that has a different color from the lenses of three light emitting portions in a vehicular marker lamp of the type described above, it becomes unnecessary to apply a surface treatment such as a coating that is required to obtain the design color.

When the dummy lens as described above is manufactured, however, a four-color molding is required, because such a front lens that includes the dummy lens needs to be formed in four colors including red, amber, clear (i.e., colorless and transparent) and design colors. A three-color molding is generally used when the front lenses for rear combination lamps are molded; however, when such front lenses are formed by a four-color molding, new molding facilities become necessary, and additional processing steps are required due to the addition of one color. Thus, the lamp manufacturing costs tend to increase.

SUMMARY OF THE INVENTION

Accordingly, the object of the present invention is to provide a vehicular lamp at low manufacturing costs that includes a red color light emitting portion, an amber color light emitting portion and a clear light emitting portion which are surrounded by a dummy portion.

Thus, in the present invention, in order to accomplish the object, the vehicular lamp is arranged so that the front portion of one of two light emitting portions consisting of the red color light emitting portion and the amber color light emitting portion is formed with a clear lens, and the other one of these two light emitting portions has a color developing function. As a result, the front lens of a marker lamp can be manufactured by a three-color molding.

More specifically, a vehicular lamp of the present invention comprises a red color light emitting portion, an amber color light emitting portion and a clear light emitting portion which are surrounded by a dummy portion, and the lamp is characterized in that:

the front portion of one of two light emitting portions consisting of the red color light emitting portion and the amber color light emitting portion is formed with a colored lens that has the same color as such one of two light emitting portions;

the front portion of the other one of these two light emitting portions and the front portion of the clear light emitting portion are formed with a clear lens;

the front portion of the dummy portion is formed with a dummy lens that has a color other than red and amber; and a predetermined optical member of the other one of two light emitting portions except for the clear lens comprises a luminescent member that develops light which is the same color as the luminescent color of the other one of the two light emitting portions when such other one of two light emitting portions is lighted.

The "predetermined optical member" is not limited to a particular optical member as long as it can develop the same color as the luminescent color of the other one of the two light emitting portions; and it may be, for example, a light bulb, a reflector, a colored transparent cap, an inner lens and the like or a selective combination of these elements.

As seen from the above, the vehicular lamp according to the present invention is provided with the red color light emitting portion, the amber color light emitting portion and the clear light emitting portion, and these light emitting portions are surrounded by the dummy portion; and further, the front portion of either one of the two light emitting portions (the red color light emitting portion, for instance) is formed with a colored lens that has the same color (red, for instance) as the color of such the light emitting portions, and the front portion of the other one of the two light emitting portions (the amber color light emitting portion, for instance) and the front portion of the clear light emitting portion are formed with the clear lens. Further, the front portion of the dummy portion is formed with the dummy lens that has a color different from these colors (red and amber). Therefore, the front lens, that includes those front portions, for the lamp can be manufactured using an existing three-color molding. Also, in the above structure, the predetermined optical member, except for the clear lens, of the other one of the two light emitting portions (the amber color light emitting portion, for instance) functions as a color developing member which develops the light of the same color (amber) as the luminescent color of the amber color light emitting portion when it is lighted. Accordingly, even the front portion of the other one of the two light emitting portions (the amber color light emitting portion) is formed clear with the clear lens, the other one of the two light emitting portions (the amber color light emitting portion) emits amber light, thus fulfilling the intended lamp function.

Accordingly, the vehicular lamp of the present invention, that is provided with the red color light emitting portion, the amber color light emitting portion and the clear light emitting portion which are surrounded by the dummy portion, can be manufactured at lower costs.

The "predetermined optical member" is not limited to a particular optical member as described above. When a light bulb and reflector are the "predetermined optical member", the entire inside area of the lamp chamber of the other one of the two light emitting portions (the amber color light emitting portion, for instance) looks substantially uniformly luminous, without using any extra parts, when such other one of the two light emitting portions is lighted.

The other one of the two light emitting portions and the clear light emitting portion may be formed continuously adjacent to each other. Alternatively, they can be provided away from each other. In this case, a portion that connects the front portion of the other one of the two light emitting portions and the front portion of the clear light emitting portion in the clear lens is covered by a dummy lens. With this structure, the other one of the two light emitting portions and the clear light emitting portion look independent from each other, though the clear lens is shared by both of these light emitting portions.

BRIEF DESCRIPTION OF THE INVENTION

PREFERED EMBODIMENTS OF THE INVENTION

Figure 1:
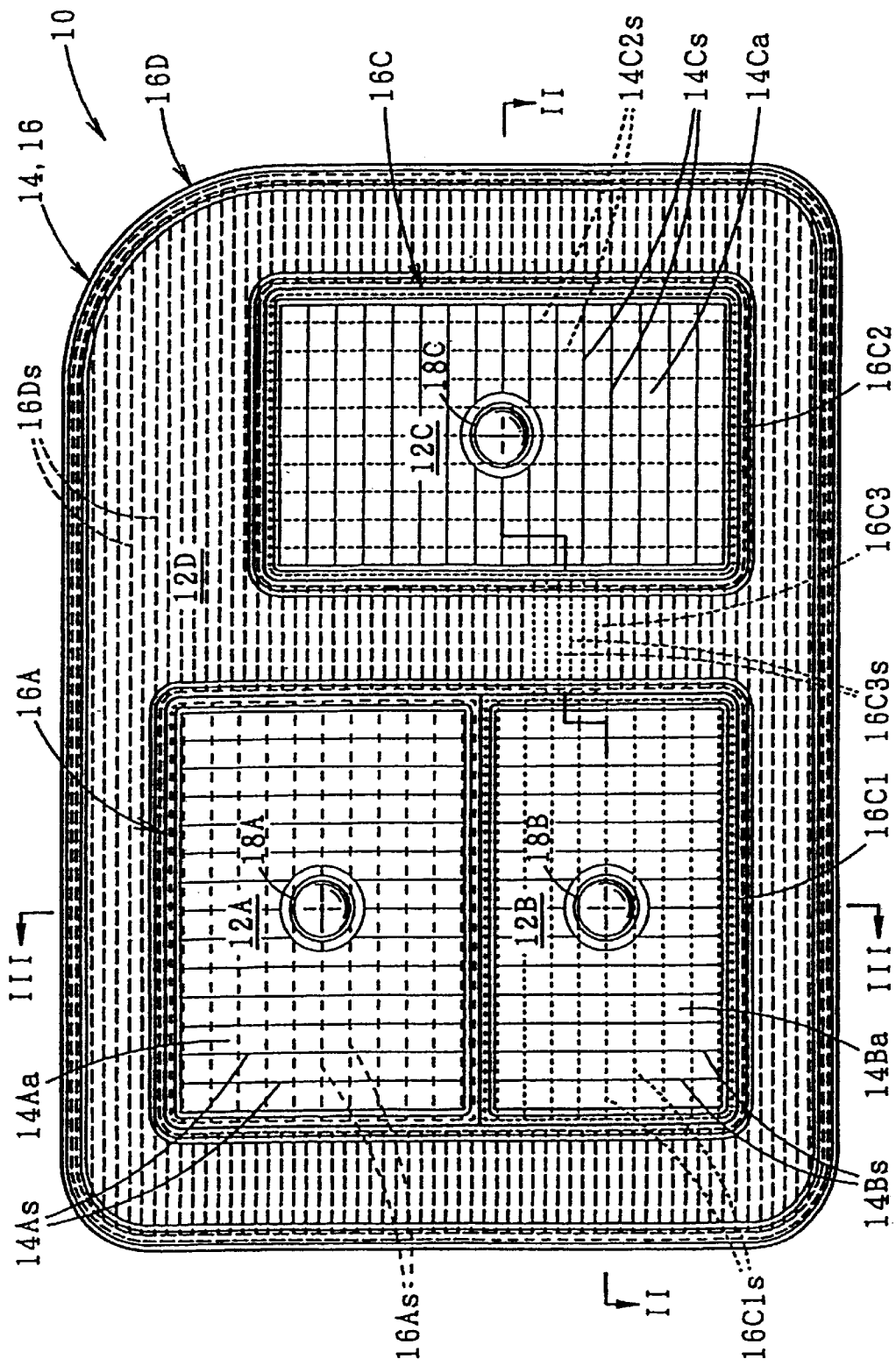
FIG. 1 is a front elevational view of a vehicular lamp in accordance with one embodiment of the present invention.

Embodiments of the present invention will be described with reference to the accompanying drawings.

As shown in the drawings, the vehicular marker lamp 10 of the present invention is a combination lamp, and it has the functions of a tail and stop (red) lamp, a turn signal (amber) lamp and a backup (clear) lamp.

The combination lamp 10 comprises a vertically arranged light emitting portion that consists of a red color light emitting portion 12A for the tail and stop lamp and an amber color light emitting portion 12B for the turn signal lamp. A clear light emitting portion 12C for the backup lamp is also a part of this combination lamp 10, and it is provided next to or away from the light emitting portions 12A and 12B. These three light emitting portions 12A, 12B and 12C are surrounded by a dummy portion 12D that does not emit any light.

The three light emitting portions 12A, 12B and 12C and the dummy portion 12D make up a lamp body 14 and a front lens 16 installed in front of the lamp body 14.

The areas in the light emitting portions 12A, 12B and 12C of the lamp body 14 are respectively formed as reflector portions 14A, 14B and 14C. The respective reflector portions 14A, 14B and 14C have reflective surfaces 14A$a$, 14B$a$ and 14C$a$; and light source bulbs 18A, 18B and 18C are installed in the respective rear end portions of these reflector portions 14A, 14B and 14C. The light source bulbs 18A and 18C are clear bulbs, and the light source bulb 18B is an amber color bulb.

A plurality of vertically-striped reflective elements 14A$s$ and 14B$s$ are formed on the respective reflective surfaces 14A$a$ and 14B$a$ of the reflector portions 14A and 14B, so that light from the light source bulbs 18A and 18B is laterally diffused and reflected. On the other hand, a plurality of horizontally-striped reflective elements 14C$s$ are formed on the reflective surface 14C$a$ of the reflector portion 14C, so that light from the light source bulb 18C is vertically diffused and reflected thereby. Amber color paint is applied on the reflective surface 14B$a$ of the reflector portion 14B.

The area in the dummy portion 12D of the lamp body 14 is formed as a dummy reflector portion 14D.

The front lens 16 is molded by a three-color molding, thus being a three-color molded lens. The portion positioned in front of the red color light emitting portion 12A is a red color lens 16A, and the portions positioned in front of the respective amber color light emitting portion 12B and clear light emitting portion 12C are clear lens 16C. The portion positioned in front of the dummy portion 12D is a dummy lens 16D. The front lens 16 is molded so that the red color lens 16A and the clear lens 16C are integrally fitted inside the dummy lens 16D, and the thus formed front lens 16 is mounted on the lamp body 14 at the outer peripheral edge portion of the dummy lens 16D.

Figure 2:
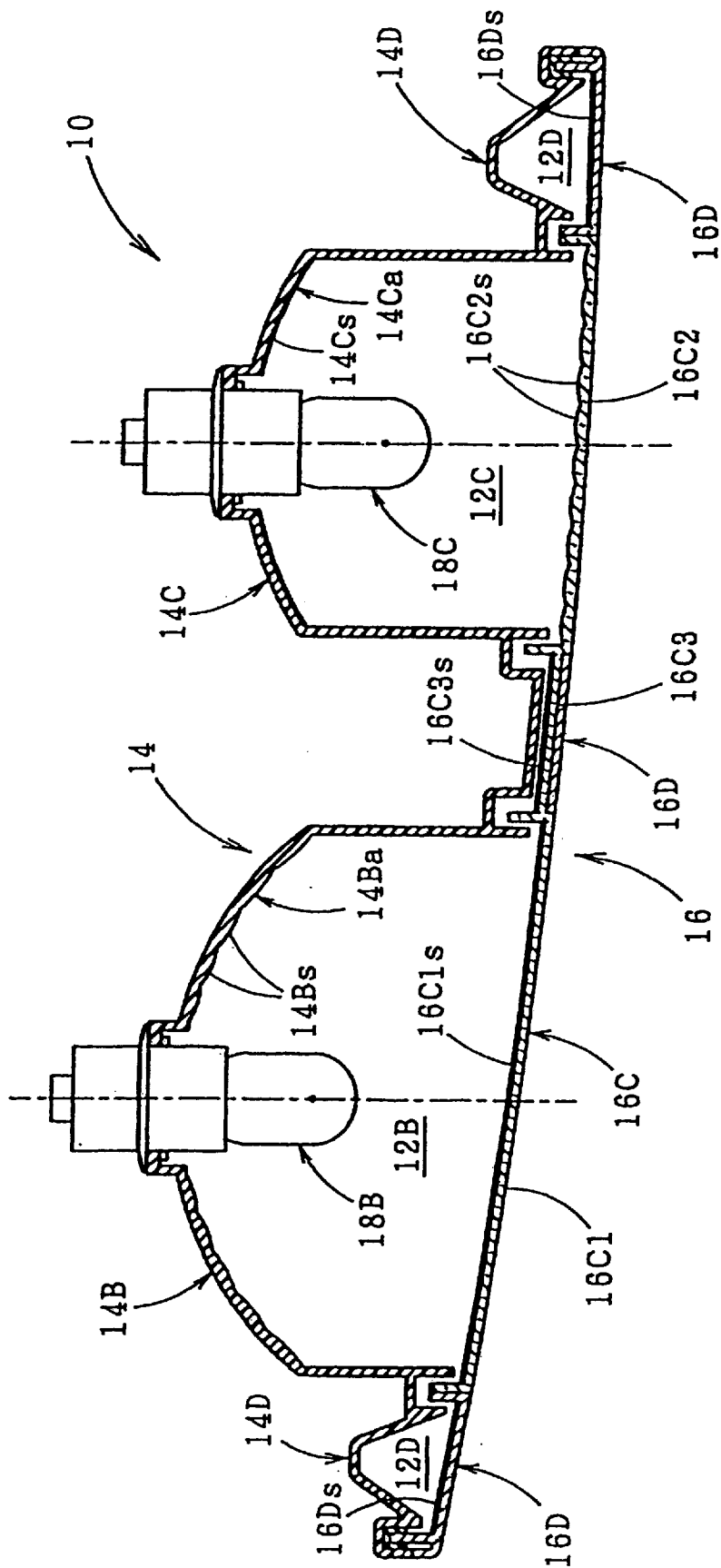
FIG. 2 is an enlarged sectional view taken along the line II—II of FIG. 1.

As seen from the above, the amber color light emitting portion 12B and the clear light emitting portion 12C are provided at separate locations; and as best shown in FIG. 2 a connecting portion 16C3 of the clear lens 16C that is between the front portion 16C1 of the amber color light emitting portion 12B and the front portion 16C2 of the clear light emitting portion 12C is in a tab form, and the surface of the connecting portion 16$c$3 is covered by the dummy lens 16D.

Figure 3:
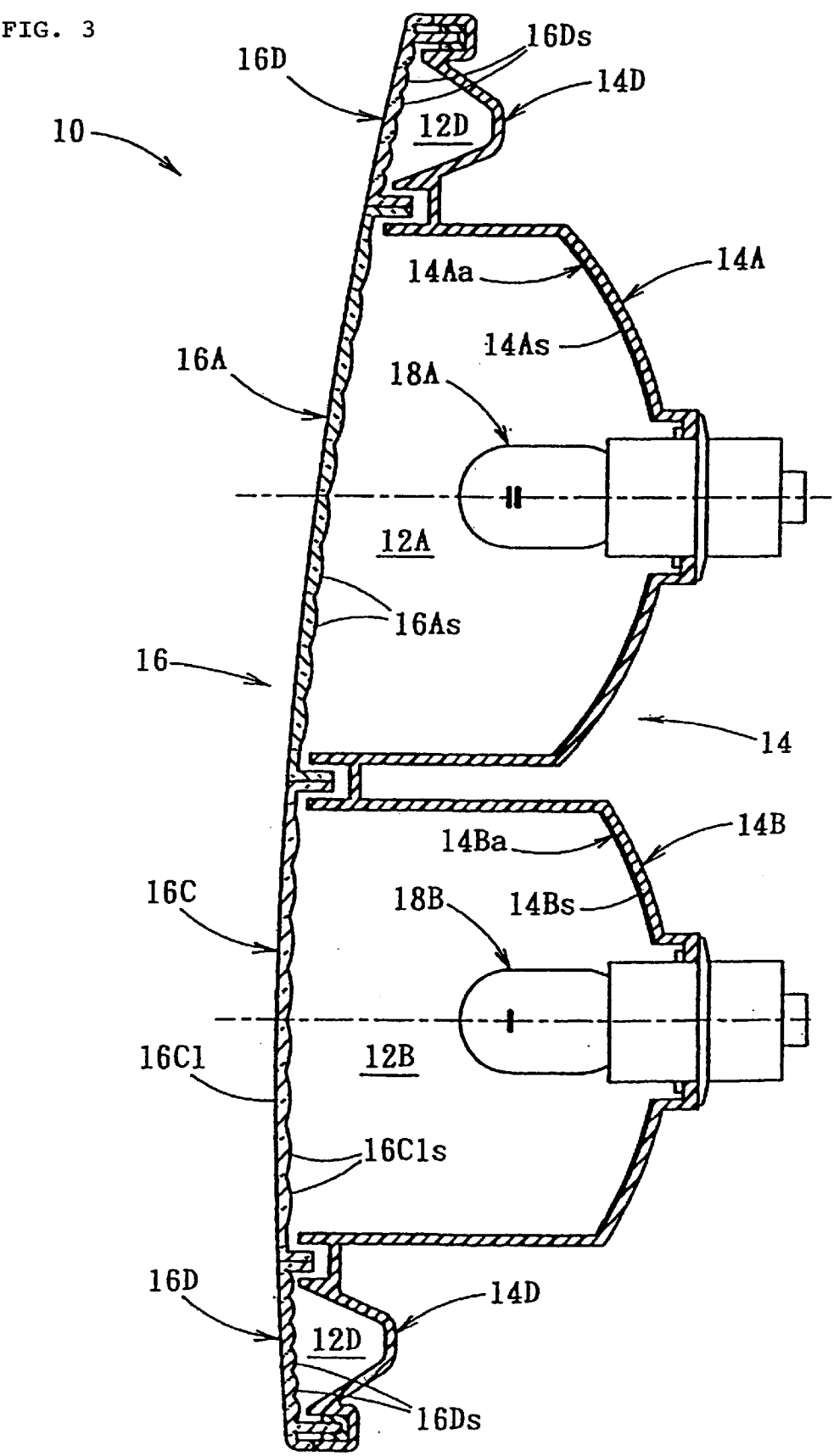
FIG. 3 is an enlarged sectional view taken along the line III—III of FIG. 1.

As seen from FIG. 3, on the rear surface of the red color lens 16A and on the rear surface of the front portion 16C1 of the clear lens 16C of the amber color light emitting portion, a plurality of horizontally-striped reflective elements 16A$s$ and 16C1$s$ are formed. Thus, the light reflected by the reflective surfaces 14A$a$ and 14B$a$ of the light emitting portions 12A and 12B is vertically diffused and transmitted. On the other hand, as seen from FIG. 2, on the rear surface of the front portion 16C2 of the clear lens 16C of the clear light emitting portion 12C, a plurality of vertically-striped reflective elements 16C2$s$ are formed. Thus, the light reflected by the reflective surface 14C$a$ of the light emitting portion 12C is laterally diffused and transmitted.

The dummy lens 10 is a smoky (dark-ash) color lens, and a plurality of horizontally-striped dummy lens elements 16D$s$ are formed on the rear surface of the dummy lens 10. Such dummy lens elements 16D$s$ are not formed on the rear surface that covers the connecting portion 16C3 of the clear lens 16C of the dummy lens 16D; instead, a plurality of horizontally-striped dummy lens elements 16C3$s$ of the same pitch as that of the dummy lens element 16D$s$ are formed on the rear surface of the connecting portion 16C3 of the clear lens 16C.

As described above in detail, the vehicular marker lamp 10 of the present invention is provided with the red color light emitting portion 12A, the amber color light emitting portion 12B and the clear light emitting portion 12C, and these three light emitting portions 12A, 12B and 12C are surrounded by the dummy portion 12D. The front portion of the red color light emitting portion 12A comprises the red color lens 16A, and the front portions of the amber color light emitting portion 12B and clear light emitting portion 12C comprise the clear lens 16C; and further, the front portion of the dummy portion 12D comprises the smoky color dummy lens 16D. Accordingly, the front lens 16 of the vehicular marker lamp 10 that includes those front portions can be manufactured by a three-color molding. In this structure, as described above, the light source bulb 18B of the amber color light emitting portion 12B is an amber color bulb, and the reflective surface 14B$a$ of the reflector portion 14B is applied with amber color paint. Thus, though the clear lens 16C (16C1) is provided in front of the amber color light emitting portion 12B, amber light is emitted when the turn signal lamp is lighted, and a desired lamp function is thus obtained.

As seen from the above, a vehicular marker lamp having a red color light emitting portion, an amber color light emitting portion and a clear light emitting portion which are surrounded by a dummy portion can be manufactured at a low cost.

Moreover, the amber color bulb (18B) is used in the amber color light emitting portion 12B, and the amber color paint is applied to the reflective element 14B$a$ of the reflector portion 14B of the amber color light emitting portion 12B. Consequently, compared to the case in which only an amber color bulb is used as the light source for the amber color light emitting portion, the entire lamp chamber of the amber color light emitting portion 12B looks substantially uniformly luminous through the clear lens front portion 16C1 provided in front of the amber color light emitting portion, and the amber color from the amber color light bulb is not particularly emphasized. Thus, a vehicular marker lamp with an improved look is obtained.

Furthermore, in the present invention, the amber color light emitting portion 12B, that provides a feeling of depth since its front portion is formed with the clear lens 16C (16C1), and the red color light emitting portion 12A, that provides no feeling of depth since its front portion is formed with the red color lens 16A, are disposed next to each other. This arrangement provides the lamp with a stereoscopic look when the lamp is not lighted.

Furthermore, in the present invention, the amber color light emitting portion 12B and the clear light emitting portion 12C whose front portions are both formed with the clear lens 16C (16C1, 16C2) are disposed at separate locations, and the dummy portion 12D is disposed in between. This arrangement provides the lamp with a higher stereoscopic look when the lamp is not lighted.

In addition, the connecting portion 16C3 between the front portion 16C1 of the amber color light emitting portion 12B and the front portion 16C2 of the clear light emitting portion 12C of the clear lens 16C is covered by the dummy lens 16D. Accordingly, these light emitting portions 12B and 12C look independent from each other, though the clear lens 16C is shared by the front portions of these light emitting portions.

The description above is given with respect to a marker lamp in which the clear lens 16C is provided in front of the amber color light emitting portion 12B and clear light emitting portion 12C. However, the same effect as in the above is obtained from a vehicular marker lamp in which the clear lens 16C is provided in front of the red color light emitting portion 12A and clear light emitting portion 12C.

What is claimed is:

1. A vehicular lamp comprising:

a red color light emitting portion;

an amber color light emitting portion;

a clear light emitting portion; and a dummy portion surrounding said red and amber and clear light emitting portions, wherein a front portion of one of two light emitting portions consisting of said red color light emitting portion and said amber color light emitting portion is formed with a colored lens that has a same color as said one of two light emitting portions;

a front portion of other one of said two light emitting portions consisting of said red color light emitting portion and said amber color light emitting portion and a front portion of said clear light emitting portion are formed with a clear lens;

a front portion of said dummy portion is formed with a dummy lens that has a color other than red or amber; and a predetermined optical member of a plurality of optical members that constitute said other one of said two light emitting portions develops color which is the same as a luminescent color of said other one of said two light emitting portions when said other one of said two light emitting portions is lighted.

2. A vehicular lamp according to claim 1, wherein said predetermined optical member is a light source bulb and a reflector.

3. A vehicular lamp according to claim 1, wherein said other one of said two light emitting portions is disposed away from said clear light emitting portion, and wherein a connecting portion between said front portion of said other one of said two light emitting portions and said front portion of said clear light emitting portion of said clear lens is covered by said dummy lens.

4. A vehicular lamp according to claim 2, wherein said other one of said two light emitting portions is disposed away from said clear light emitting portion, and wherein a connecting portion between said front portion of said other one of said two light emitting portions and said front portion of said clear light emitting portion of said clear lens is covered by said dummy lens.

5. A vehicular lamp comprising:

a red color light emitting portion;

an amber color light emitting portion;

a clear light emitting portion; and a dummy portion surrounding said red and amber and clear light emitting portions, wherein a red color lens is provided in a front portion of said red color light emitting portion;

a colorless lens is respectively provided in a front portion of said amber color light emitting portion and said clear light emitting portion; and a dummy lens that has a color other than red or amber is provided in a front portion of said dummy portion; and wherein said amber color light emitting portion is provided therein with an amber color reflective surface and an amber color light bulb.

* * * * *